Sept. 8, 1970  J. L. JEZL ET AL  3,527,845
METHOD OF REDUCING FINES IN ALPHA-OLEFIN POLYMER POWDER
Filed June 28, 1967  2 Sheets-Sheet 2
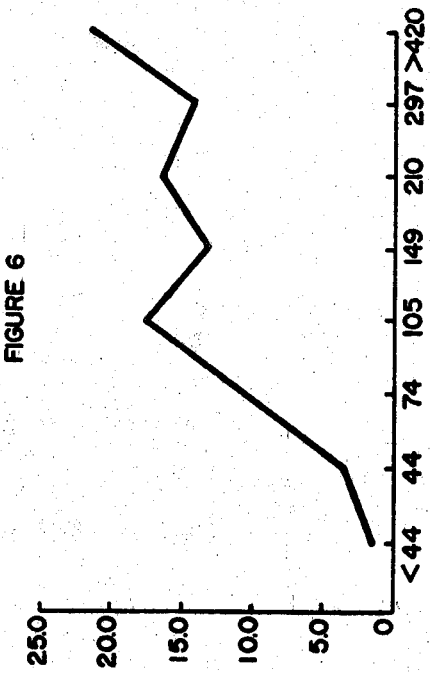
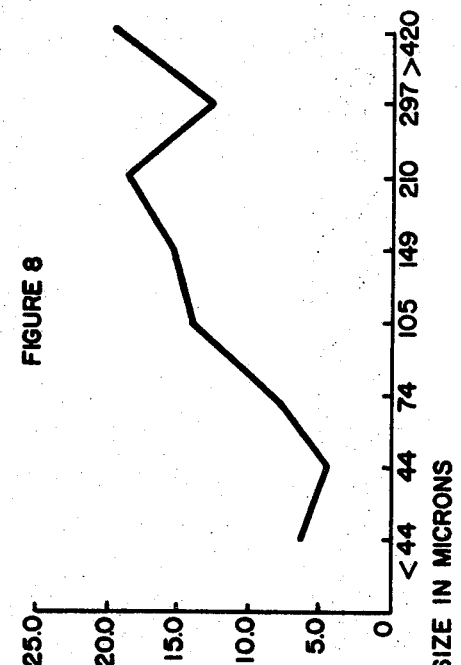
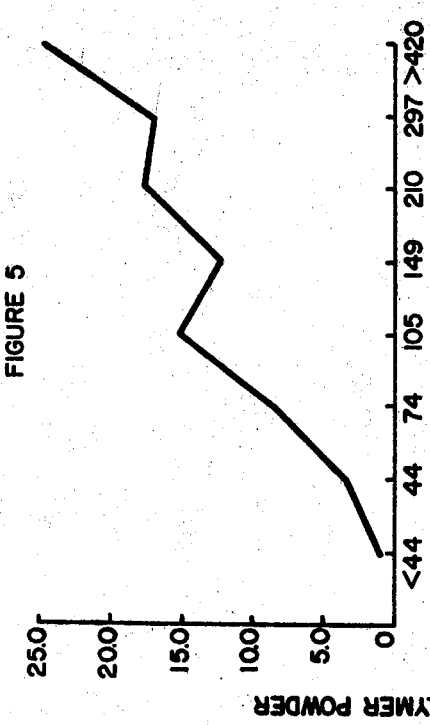
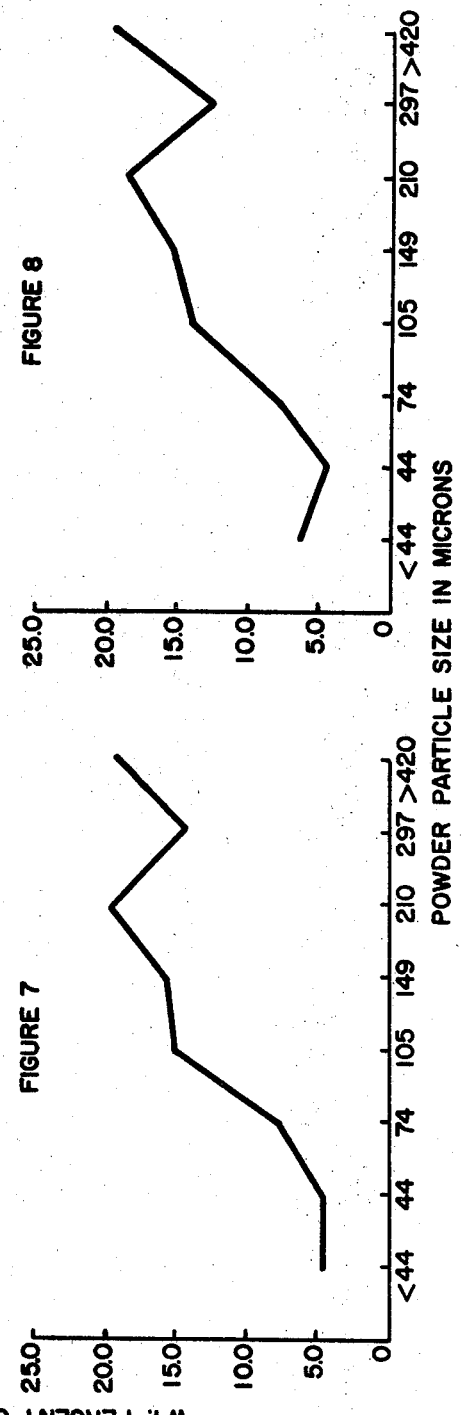

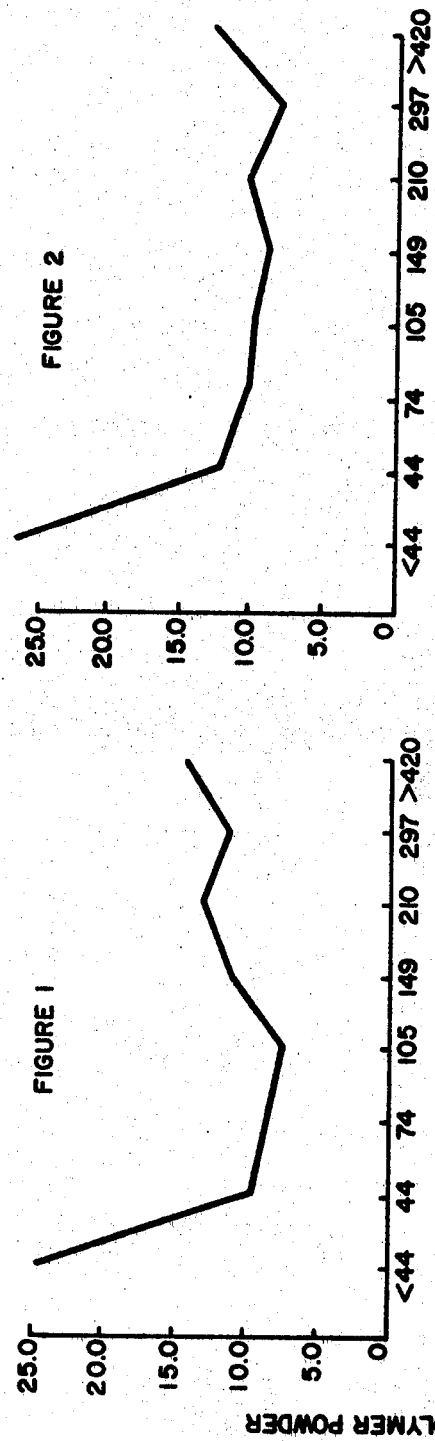

United States Patent Office 3,527,845
Patented Sept. 8, 1970

3,527,845
METHOD OF REDUCING FINES IN ALPHA-OLEFIN POLYMER POWDER
James L. Jezl, Swarthmore, and Habet M. Khelghatian, Springfield, Pa., and Donald F. Knaack, Wilmington, Del., assignors to Avisun Corporation, Philadelphia, Pa., a corporation of Delaware
Filed June 28, 1967, Ser. No. 649,606
Int. Cl. C08f 29/12
U.S. Cl. 260—897                                   6 Claims

ABSTRACT OF THE DISCLOSURE

A method for reducing the amount of powder fines in finely divided crystalline polymer powder recovered from stereoregular polymerization of $C_3$–$C_8$ alpha monoolefins which comprises blending a finely divided crystalline $C_3$–$C_8$ alpha monoolefin polymer powder with 2 to 30 weight percent of crystalline ethylene polymer or a crystalline propylene-ethylene copolymer, agitating and heating the polymer powder blend at a temperature in the range of 100°–160° C. for the time necessary to reduce powder fines content in the polymer powder blend.

BACKGROUND OF THE INVENTION

The present invention relates to a process for reducing the amount of polymer powder fines in finely divided crystalline alpha monoolefin polymer powder, and the product of that process.

Procedures for making crystalline, high molecular weight polymers from $C_3$–$C_8$ alpha monoolefins such as propylene, butene-1,4-methylpentene-1 by low pressure stereoregular polymerization techniques are now well known. Examples of some of these procedures including the coordinated complex catalysts used therein can be found in the disclosures of various U.S. and foreign patents including U.S. Pat. Nos. 2,827,446; 2,996,491; 2,996,-493; 3,055,878; 3,099,647; Belgian Pat. Nos. 533,362; 534,792; 534,888; and others.

The polymerization is normally carried out in the presence of a low boiling inert liquid hydrocarbon. In the process high molecular weight crystalline polymer usually precipitates in the form of finely divided solid powder particles. This polymer powder is normally separated from the polymerization medium by means of a centrifuge or by filtering and is subsequently dried. A finely divided polymer powder containing a substantial amount (e.g., 20 to 50 weight percent) of polymer fines is normally recovered. By polymer fines is meant solid crystalline polymer powder particles having a diameter of less than 74 microns. Unfortunately, this polymer powder is difficult to process in standard melt extruders and other well known processing apparatus because of the poor flow characteristics of the polymer powder due to the high concentrations of powder fines.

It has been recognized recently that the reduction of polymer fines in crystalline alpha monoolefin polymer powder improves processing characteristics of the powder, particularly the powder flow properties. Generally a polymer powder having a substantial amount of particles in the range of sizes in 75 to 250 microns is known to have good characteristics. Several U.S. patents including U.S. Pat. Nos. 3,004,019; 3,020,268; 3,189,588; and 3,251,428 disclose procedures for agglomerating finely divided crystalline polymer powder to improve the processing properties of the powder. It is significant that all of the methods disclosed in these patents require the use of a liquid medium of some type to effect their intended result. The use of liquid solvents inherently requires the use of costly solvent recovery equipment as well as the added power requirements to operate this equipment. The added costs incurred in new equipment and additional operation expenditures often renders such a commercial process marginal at best. It is highly desirable to improve the flow characteristics of polymer powder without incurring the additional costs and time consumption inherent in the prior art procedures referred to above. These undesirable aspects of prior art procedures can be avoided by use of the method of the present invention.

DESCRIPTION OF THE INVENTION

It has now been discovered that finely divided crystalline $C_3$–$C_8$ alpha olefin polymer powder synthesized by the above-disclosed procedures and having particle size distributions which are not conducive to producing a free-flowing powder may be processed so as to rearrange the particle size distribution of the polymer powder to produce a powder having improved flow properties and other processing characteristics.

The present invention relates to a method for reducing powder fines in finely divided crystalline polymer powder recovered from the stereospecific polymerization of $C_3$–$C_8$ alpha monoolefins and to the products produced by that method.

More particularly, this invention relates to a method whereby a finely divided crystalline polymer powder recovered from the stereospecific polymerization of $C_3$–$C_8$ alpha monoolefins and containing a substantial quantity of powder fines which make the powder difficult to process is blended with a crystalline ethylene polymer powder or a crystalline propylene-ethylene copolymer powder, and the blend is heated and agitated at a temperature in the range of 100°–160° C. for a period of 5 to 200 minutes thereby substantially reducing the powder fines in the blend and consequently providing a polymer powder having improved processing qualities.

Now referring to the drawings:

FIG. 1 represents the particle size distribution of a typical sample of finely divided crystalline polypropylene powder as disclosed in Example I given below.

FIGS. 2–8 represent the particle size distribution of finely divided crystalline polypropylene powder after the powder has been processed in the manner disclosed in Examples II–VIII respectively, which examples are presented in detail below.

Methods of preparing crystalline ethylene polymers are also well known to those skilled in the art, and are described in detail in vol. XI of the High Polymer series by K. A. V. Roff and J. B. Allison (Interscience Publishers, New York (1956)). Crystalline ethylene polymers can also be synthesized by the procedures disclosed in the above-noted U.S. and Belgian patents.

Several methods of preparing crystalline copolymers of propylene and ethylene which can also be used in the process of the present invention are disclosed in U.S. Pat. No. 3,268,624 and No. 3,296,338. Either the crystalline ethylene homopolymer or the crystalline propylene-ethylene copolymer alone or in combination are effective in reducing powder fines of crystalline polymer powders of $C_3$–$C_8$ alpha monoolefins when blended and processed according to the procedures herein described. The crystalline ethylene-propylene copolymer powder preferably contains from 1 to 30 weight percent polymerized ethylene and has a vicat softening point of less than 140° C.

The crystalline ethylene homopolymers and the crystalline propylene-ethylene copolymers which can be used in the present invention should have a vicat softening point in the temperature range of 75°–140° C. Also the ethylene polymer used with the $C_3$–$C_8$ alpha monoolefin powder should have a vicat softening point of at least 5° C. below the vicat softening point of the $C_3$–$C_8$ alpha monoolefin polymers.

Generally the process of the present invention comprises first blending the finely divided crystalline $C_3$–$C_8$ olefin polymer powder by any suitable means well known to the art with 2–30 weight percent and preferably 10–20 weight percent based on the weight of the whole composition of crystalline ethylene polymer powder or crystalline propylene-ethylene copolymer powder. The powder blend is thereafter heated and agitated at a temperature in the range of 100°–160° C. and preferably 120°–140° C. for the time necessary to substantially reduce the powder fines in the polymer blend. Normally a time of 5–200 minutes is sufficient to reduce the fines in the polymer powder blend, with 10–60 minutes being the preferred time period. The powder is then cooled to provide a powder blend having a substantially lower content of powder fines.

It has also been discovered that, while accomplishing the objects of particle size rearrangement of alpha olefin polymer powders, another advantageous result may also be accomplished. It has been found that additives such as thermal and ultraviolet stabilizers, slip agents, dyeing additives, and plasticizers can be incorporated into the polymer powder agglomerates by the processes disclosed herein so as to accomplish in situ stabilization and/or incorporation of additives to the dry polymer powder before it is exposed to ultraviolet light or melting and shear stress and thereby produce a more stable finished powder.

Also, by accomplishing the incorporation of additives into the powder agglomerates wherein powder fines are also eliminated, subsequent blending and pelletizing by melt extrusion is unnecessary, thereby eliminating these costly finishing steps. The elimination of these finishing steps offers economic advantages, as well as the advantages of less shear and thermal degradation, which is a common result of melt extrusion and pelletizing and is known to be detrimental to the physical properties of the finished form of the polymer.

The additives which can be incorporated into polyolefin polymer powder particles by the process of the present invention are those known or suitable polymer-improving additives. Known ultraviolet and thermal stabilizers which are effective in inhibiting degradation of alpha-olefin polymers and copolymers such as those disclosed in U.S. Pat. No. 2,985,617 to Ivol O. Saylor et al. may be used in the process of this invention.

Slip agents known to the art such as long-chained $C_{10}$–$C_{30}$ alkylamids can be used in the process of this invention as polymer-improving additives.

Organic compounds and organometallic complex dye receptors including silicic acid, ammonium alkylbenzenesulfonate, polybasic carboxylic acids, metal salts of fatty acids, amines, organic complexes of chromium salts, and others which are commonly known in the art as dye receptive compounds can be added to polymer powders prior to agglomeration in the process of this invention. Other compounds such as those recited in U.S. Pat. Nos. 2,893,970 and 2,984,634; French Pat. Nos. 1,315,298; 1,338,576; and 1,350,895; Belgian Pat. Nos. 610,060; 631,671; 630,351; and 617,280; and others can be used in the practice of this invention.

Where it is desired to incorporate polymer improving additives such as degradation inhibitors, slip agents, or dye receptive compounds, they can be blended with the powder prior to heating and agitating the powder. Subsequent agglomeration of the powder blend containing the polymer improving additives results in encapsulation of a portion of the additives in the resulting agglomerated powder particles thereby resulting in an improved polymer powder.

Particle size distributions of polymer powders disclosed herein were determined by using a series of U.S. Standard sieves corresponding to the particle sizes reported. The procedure of particle size determination using the above-mentioned sieves is well known to those skilled in the art.

An evaluation of flow properties of polymer powders can be achieved in the following manner:

(a) An elongated clear glass quart jar fitted with a cap is filled half full with the powder to be evaluated. The jar is capped, placed in a horizontal position, and rotated or rolled slowly. If the powder flows freely in the jar in a manner similar to a liquid, with no bridging, build-up, or hang-up on the walls of the jar, it is termed a good flowing powder. If the powder flows unevenly in the jar with build-up and bridging occurring on the walls of the jar, the powder is judged to have poor flow properties.

(b) A second method of evaluation is a comparison of the quantity of powder which will feed through a screw-type melt extruder. The rate at which a powder can be melt-extruded may be directly related to the flow properties of that powder.

Any commercially available melt extruder can be used in polymer flow evaluation. The melt extruder used in the present evaluation consisted of a 27-inch long, 2-inch outside diameter, heated barrel having a conventional conical hopper at one end and an 0.25-inch orifice at the other. The heated barrel contained an 0.75-inch screw and means for rotation of the screw.

As a further illustration of the process of the present invention the following examples are given with all quantities presented in terms of weight percent unless otherwise stated.

Example I

A finely divided crystalline polypropylene powder was prepared by polymerizing propylene monomer in a glass-lined, sealed reactor at a temperature of about 70° C. and a pressure of about 60 p.s.i.g. The polymerization was accomplished by dissolving the propylene monomer in hexane containing a coordinated catalyst consisting of diethylaluminum chloride and titanium trichloride. After the desired amount of polymerization was complete the polymer solvent slurry was discharged into a second reaction vessel (or kill tank) and admixed with 10 volume percent methanol to deactivate the catalyst. The polymer slurry was discharged into a rotating centrifuge wherein a substantial part of the liquid phase of the polymer solvent slurry was removed leaving a polymer wet cake. The polymer wet cake was thereafter discharged into a dryer consisting of a rotating heated drum maintained at 100° C. and was processed therein until the polymer powder was substantially free of volatiles. A dry, white, finely divided crystalline polypropylene powder was recovered from the dryer.

A 100-gram sample of this polypropylene powder was analyzed for particle size distribution and processing characteristics. The results of the particle size analysis are presented in the accompanying table and are also represented in FIG. 1. The processing characteristics are discussed below.

Example II

A 100 gram sample of the polypropylene powder produced by the procedures disclosed in Example I was placed in a one liter round bottom glass vessel fitted with a stirrer and having a means for nitrogen purging. The powder was agitated and heated to a temperature of 140° C. in a nitrogen atmosphere and maintained under these conditions for about 30 minutes. The powder was then cooled to room temperature and was analyzed for particle size distribution and processing characteristics. The results of the particle size analysis are presented under Example II in the table and also as FIG. 2. The processing characteristics of this powder are given below.

Example I provides an illustration of the type of finely divided crystalline polymer powder normally produced by stereospecific polymerization of $C_3$–$C_8$ alpha monoolefins to highly crystalline polymer powder. The data presented in the table points out that this polymer powder contains a large proportion of polymer fines which are polymer particles having a diameter of less than 74 microns. As has been previously stated, this is an undesirable powder characteristic.

Example II illustrates that a process which involves heating and mixing of polypropylene powder alone without the addition of a crystalline ethylene polymer powder or crystalline propylene-ethylene copolymer powder is ineffective in reducing the fines content of the polypropylene powder. A comparison of the particle size distribution data of Example II with that of Example I illustrates that the steps of mixing and heating alone result in a polypropylene powder having an even larger amount of powder fines. It appears that without the presence of the added ethylene polymer or copolymer in the polypropylene powder during the heating and mixing procedures the larger powder agglomerates which were naturally in the polymer powder are broken down into smaller particles, thereby resulting in a polymer powder which has a higher fines content and is often even more difficult to process than the starting material.

The powder samples of Examples I and II were both found to have poor flow characteristics when evaluated by the glass jar technique and were also difficult to extrude in a standard melt extruder.

To illustrate the improvements achieved by process embodiments of the present invention, the following examples are given:

Example III 90 grams of polypropylene powder identical to that of Example I were blended with 10 grams of low density polyethylene powder characterized as a fine powder having an average particle size of less than 20 microns, a vicat softening temperature of 81° C., a density of 0.915 gm./cc., and a melt index of 22. The polypropylene/polyethylene powder blend was heated to a temperature of 100° C. in a nitrogen atmosphere while being agitated using the type of apparatus described in Example II. The polymer powder blend was processed in this manner for 60 minutes, permitted to cool to room temperature and then analyzed for particle size distribution. The results of this analysis appear in the table under Example III and are also represented by the curve in FIG. 3. The polymer powder was also evaluated for processing characteristics which are discussed below.

Example IV

A polymer powder blend identical to that of Example III was processed by the same procedure disclosed in Example II with the exception that the temperature of the powder blend was maintained at 120° C. during the process. The polymer powder was thereafter analyzed for particle size distribution. The results of this analysis appear in the table under Example IV and are also represented by the curve in FIG. 4.

Example V

A polymer powder blend of the same materials as in Example III but containing 20 weight percent polyethylene was processed by the same procedure and subsequently also evaluated in the same manner as disclosed in Example III. These results appear in the table under Example V and are represented in the drawings as FIG. 5.

Example VI

A polymer powder blend of the same materials as in Example III but containing 8 weight percent polyethylene was processed and evaluated in the identical manner as disclosed in Example II. The results of this procedure appear in the table under Example VI and are represented in the drawings as FIG. 6.

Example VII 92 grams of polypropylene powder identical to that disclosed in Example I were blended with 8 grams of a low density polyethylene powder characterized as having an average particle size of 297 microns, a vicat softening point of 85° C., a density of 0.916 gm./cc. and a melt index of 22. This polymer powder blend was processed and evaluated in the identical manner as disclosed in Example VI. The results of this procedure appear in the table under Example VII and are represented in the drawings as FIG. 7.

EXAMPLE VIII 90 grams of polypropylene powder identical to that disclosed in Example I were blended with 10 grams of crystalline propylene-ethylene random copolymer containing 1.5 weight percent polymerized ethylene and further characterized by a vicat softening point of 137° C., a melt index of 7, and an average particle size of 74 microns. This polymer powder blend was processed and evaluated in the identical manner as disclosed in Example VI. The results of this evaluation appear in the table under Example VIII and is represented in the drawings as FIG. 8.

The results achieved by one mode of the process of the present invention as disclosed in Examples I through VII are clearly set forth in the table below.

TABLE

| | Processing conditions, wt. percent | | | Wt. percent polymer powder in measured range | | | | | | | | Total wt. percent fines 74 |
|---|---|---|---|---|---|---|---|---|---|---|---|---|
| | Temp., °C. | Time, min. | Added ethylene polymer | Distribution ranges in microns | | | | | | | | |
| | | | | <44 | 44–74 | 74–105 | 105–149 | 149–210 | 210–297 | 297–420 | >420 | |
| Ex. I | CONTROL | | | 24.4 | 9.6 | 8.5 | 7.4 | 11.4 | 13.1 | 11.4 | 14.2 | 34.0 |
| Ex. II | 140 | 30 | 0 | 26.6 | 12.6 | 10.5 | 10.0 | 9.1 | 10.5 | 8.1 | 12.6 | 39.2 |
| Ex. III | 100 | 60 | 10 | 5.7 | 17.6 | 13.2 | 14.9 | 10.3 | 12.0 | 12.6 | 13.7 | 23.3 |
| Ex. IV | 120 | 60 | 10 | 1.1 | 3.4 | 8.3 | 15.0 | 12.2 | 17.8 | 17.2 | 25.0 | 4.5 |
| Ex. V | 100 | 60 | 20 | 4.2 | 7.9 | 13.9 | 18.8 | 13.3 | 13.9 | 12.7 | 15.3 | 12.1 |
| Ex. VI | 140 | 30 | 8 | 1.7 | 3.9 | 10.6 | 17.8 | 13.3 | 16.6 | 14.4 | 21.7 | 5.6 |
| Ex. VII | 140 | 30 | 8 | 4.4 | 4.4 | 7.7 | 14.9 | 15.6 | 19.3 | 14.4 | 19.3 | 8.8 |
| Ex. VIII | 140 | 30 | 10 | 6.4 | 4.5 | 8.4 | 14.2 | 15.5 | 18.7 | 12.9 | 19.4 | 10.9 |

Example III demonstrates that fines in polypropylene powder can be substantially reduced by the process of the present invention at a temperature of 100° C. with about 10 percent added polyethylene.

Example IV demonstrates that with slightly increased temperature the powder fines in polypropylene can be reduced to an even greater extent than is shown by the method of Example III.

Example V illustrates the fact that another variation to the method disclosed in Example III for reducing the fines in polypropylene powder is the addition of a larger amount of polyethylene (e.g., 20 weight percent) to the polymer powder blend.

Example VI illustrates that the fines in polypropylene powders can be reduced by the process of the present invention in a shorter period of time than that disclosed in Example III (30 minutes vs. 60 minutes) by raising the processing temperatures from 100° C. to 140° C.

Example VII illustrates that larger particle size polyethylene powders are as effective in the method of the present invention as the smaller particle size ethylene polymer powders.

Example VIII illustrates the fact that even copolymers containing only a small proportion of polymerized ethylene (e.g., 1.5 weight percent) are effective in the methods of the present invention if they qualify in the other physical requirements.

A comparison of the particle size distributions of the processed polymer powder blends recovered by the methods disclosed in Examples III through VIII with the powders of Examples I and II illustrates the effectiveness of the process of the present invention in reducing particle fines in polypropylene powders. The agglomerated polymer powders recovered in the procedures of Examples III through VIII had good flow characteristics when tested by the glass jar technique described above and demonstrate a substantial improvement in this respect.

When polypropylene powders of characteristics disclosed in Examples I and II were melt extruded the powder feed rate was less than 0.5 lb. per hour. The polymer powders recovered by the procedures disclosed in Examples III through VIII maintained feed rates of more than 1.0 lb. per hour through the same melt extruder under identical operating conditions. The improved flow properties and melt extrusion characteristics of the polymer powders recovered by the process of the present invention clearly demonstrates the improved processing characteristics of these powders over unprocessed powder. Thus, these examples clearly demonstrate the effectiveness of the process of the present invention in converting a powder that is extremely difficult to process into a powder which is easily processed.

We claim:

1. A method for reducing the amount of powder fines in finely divided crystalline homopolymer powder recovered from the stereo-regular polymerization of a $C_3$–$C_8$ alpha monoolefin which comprises blending said homopolymer powder with 2 to 30 weight percent of a crystalline ethylene polymer powder selected from the group consisting of polyethylene and propylene-ethylene copolymer, simultaneously agitating and heating the resulting polymer powder blend at a temperature in the range of 100°–160° C. for a time between 10 and 60 minutes necessary to reduce powder fines content in the polymer powder and recovering a finely divided polymer powder having a reduced amount of powder fines.

2. A method according to claim 1 wherein the alpha monoolefin is propylene.

3. A method according to claim 1 wherein the alpha monoolefin is 4-methylpentene-1.

4. A method according to claim 1 wherein the crystalline ethylene polymer powder is an ethylene-propylene copolymer containing 1 to 30 weight percent polymerized ethylene.

5. A method according to claim 2 wherein the crystalline ethylene polymer powder is an ethylene-propylene copolymer containing 1 to 30 weight percent polymerized ethylene.

6. A method according to claim 1 wherein a polymer improving additive is added to the polymer powder prior to heating and agitating the powder.

References Cited

UNITED STATES PATENTS 3,256,366   6/1966   Corbelli _____ 260—897

FOREIGN PATENTS 978,612   12/1964   Great Britain.
897,643   5/1962   Great Britain.

MURRAY TILLMAN, Primary Examiner

C. J. SECCURO, Assistant Examiner

U.S. Cl. X.R.

260—23